United States Patent
Joung et al.

(10) Patent No.: US 9,510,238 B2
(45) Date of Patent: Nov. 29, 2016

(54) MAC SHARING METHOD FOR DISTRIBUTED PROCESSING OF UE TRAFFIC IN MOBILE COMMUNICATION SYSTEM

(71) Applicant: INNOWIRELESS CO., LTD., Gyeonggi-do (KR)

(72) Inventors: Jin Soup Joung, Gyeonggi-do (KR); Seung Hwan Ji, Gyeonggi-do (KR); Myung Jong Kim, Gyeonggi-do (KR); Seung Hwan Lee, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 113 days.

(21) Appl. No.: 14/639,400

(22) Filed: Mar. 5, 2015

(65) Prior Publication Data
US 2016/0192237 A1 Jun. 30, 2016

(30) Foreign Application Priority Data

Dec. 26, 2014 (KR) .......................... 10-2014-0190899

(51) Int. Cl.
*H04L 12/26* (2006.01)
*H04W 28/08* (2009.01)

(52) U.S. Cl.
CPC .......... *H04W 28/08* (2013.01); *H04L 12/2692* (2013.01)

(58) Field of Classification Search
CPC ....... H04L 47/10; H04L 47/35; H04L 47/30; H04L 47/32; H04L 12/5602; H04L 2012/5636; H04L 43/026; H04L 43/50; H04L 45/02; H04L 41/12; H04L 45/00; H04L 45/04; H04L 43/12
USPC ................... 370/235, 252, 229, 230.1, 235.1
See application file for complete search history.

(56) References Cited

U.S. PATENT DOCUMENTS

| | | | | |
|---|---|---|---|---|
| 2004/0120334 A1* | 6/2004 | Nation | ............... | H04L 47/10 370/412 |
| 2011/0007664 A1* | 1/2011 | Diab | ................ | H04L 12/40136 370/254 |

FOREIGN PATENT DOCUMENTS

| KR | 1020040024784 A | 3/2004 |
|---|---|---|
| KR | 101092738 | 5/2006 |

* cited by examiner

*Primary Examiner* — Brenda H Pham
(74) *Attorney, Agent, or Firm* — Kaplan Breyer Schwarz & Ottesen, LLP

(57) ABSTRACT

Provided is a media access control processing unit (MAC) sharing method applied to a fifth generation (5G), which is a next generation, mobile communication system and making it possible to efficiently share a plurality of MACs so as to efficiently distribute and process traffic of user equipment (UE).

10 Claims, 14 Drawing Sheets

FIG. 4C

| 1 | 2 | 3 | 4 | 5 | 6 |
|---|---|---|---|---|---|
| 7 | 8 | 9 | 10 | 11 | 12 |
|  | 13 | 14 | 15 | 16 |  |

FIG. 4E

MAC SHARING METHOD FOR DISTRIBUTED PROCESSING OF UE TRAFFIC IN MOBILE COMMUNICATION SYSTEM

CROSS-REFERENCE TO RELATED APPLICATION

This application claims priority to and the benefit of Korean Patent Application No. 10-2014-0190899, filed on Dec. 26, 2014, the disclosure of which is incorporated herein by reference in its entirety.

FIELD OF THE INVENTION

The present invention relates to a media access control (MAC) processing unit (simply referred to as "MAC" below) sharing method for distributed processing of user equipment (UE) traffic in a mobile communication system, and more particularly, to an MAC sharing method applied to a fifth generation (5G), which is a next generation, mobile communication system and making it possible to efficiently share a plurality of MACs so as to efficiently distribute and process traffic of UE.

BACKGROUND OF THE INVENTION

Currently, the International Telecommunication Union-Radiocommunication sector (ITU-R) is developing a vision of various convergence services based on a 5G network. Also, the South Korean government established a development strategy for the future mobile communication industry in January 2014, and selected a social network service (SNS), mobile three-dimensional (3D) imaging service, intelligent service, super high-speed service, and ultra high-definition (UHD) imaging/hologram service as five key services.

In addition, the European Union, China, Japan, South Korea, etc. established a task force for discussing a 5G network and service, and are discussing a user-oriented 5G service reflecting the lifestyle of 2020, which is the target time of commercializing 5G, in tandem with an innovation of mobile communication technology for providing an ultra high transmission rate of gigabytes per second to users.

Internationally, 5G requirements and technology standards have not yet been determined, but the requirements are expected to be determined for about five different aspects.

Ultra high speed & low latency: 1000 times higher speed than Long Term Evolution (LTE), a ultra-low latency response time of less than a few milliseconds, and realistic content Massive/seamless connectivity: accommodation of 1000 times more devices and traffic, and ensuring seamless connectivity Intelligent/flexible network: provision of a software-based structure, real-time data analysis, and intelligent/personalized services Reliable/secure operation: network availability/reliability of more than 99%, and self-healing/reconfiguration Energy/cost-efficient infrastructure: 50 to 100 times higher energy efficiency than LTE, and a reduction in the cost of infrastructure/devices Meanwhile, in 5G mobile communication, a study is being conducted on the use of a millimeter wave band in which it is easy to ensure a continuous wide bandwidth of a minimum of 500 MHz or more, for example, extremely high frequency (EHF) bands of 27 to 29 GHz and 70 to 80 GHz, but an agreement has not yet been reached. In these EHF bands, it is possible to highly increase the density of antennas. Therefore, when the physical size of an antenna is determined, the interval between radiators constituting an antenna is reduced with an increase of a frequency, and thus an increased number of radiators can be included.

A plurality of radiators serve as the hardware basis of 3D beamforming technology for generating antenna beams in various shapes by controlling the magnitude and the phase of a radio frequency (RF) signal and massive multiple-input multiple-output (MIMO) technology which enables multiple transmissions. In this way, it is expected that the 3D beamforming technology for configuring an optimal RF environment and performing high-speed transmission by controlling electric field strength vertically or horizontally according to the distribution of users or by forming several beams and beam switching/tracking technology for providing an optimal link by selecting an optimal beam from among several beams or by changing the beam direction of an antenna according to the location of a user will be actively applied to 5G mobile communication.

FIG. 1 is a diagram showing a configuration of a base station that is applicable to 5G mobile communication. As shown in FIG. 1, a mobile communication cell managed by one base station can be divided into three sectors A, B, and C. Each sector can be divided into a plurality of, for example, 16, beam spots, and RF modules, which have beam antennas to process an analog signal, which can be configured to correspond to the beam spots, on a one-to-one basis.

FIG. 2 shows a connection relationship between MACs and modems in 5G mobile communication. As shown in FIG. 2, according to 5G mobile communication, a total of 16 beam spots dividing each sector of a mobile communication cell correspond to RF modules which have beam antennas to process an analog signal on a one-to-one basis. The RF modules correspond to modems which perform baseband signal processing, for example, channel coding/decoding, digital modulation/demodulation, multi-antenna processing, and generation of an orthogonal frequency division multiplexing (OFDM) signal, on a one-to-one basis, and the modems also can correspond to MACs which perform mapping between logical channels and transmission channels, error correction, and distribution of time and frequency resources to a plurality of pieces of UE on a one-to-one basis.

Assuming that the modems which correspond to the beam spots on a one-to-one basis also correspond to the MACs on a one-to-one basis as indicated by dotted lines in FIG. 2, there may be a relatively large amount of UE traffic at a specific beam spot, whereas there is a relatively small amount of UE traffic at other beam spots. In this case, there is no way to distribute the large amount of UE traffic, and thus an MAC managing the beam spot at which the large amount of UE traffic is concentrated provides degraded service quality due to a lowered processing speed.

This work was supported by the Giga KOREA project of MSIP/Giga KOREA Foundation, Republic of Korea. [GK14N0100, Development of millimeter wave-based 5G mobile communication system]

RELATED DOCUMENTS

1. Korean Patent Publication No. 10-2004-0024784 (Method for composing distributed MAC protocol with service differentiation over IEEE 802.11 Ad-Hoc Wireless LANs)

2. Korean Patent No. 10-1092738 (System and Method for Optimizing Radio Access Network Using Traffic Morphology)

SUMMARY OF THE INVENTION

The present invention is directed to a media access control processing unit (MAC) sharing method applied to a fifth generation (5G), which is a next generation, mobile communication system and making it possible to efficiently share a plurality of MACs so as to efficiently distribute and process the traffic of user equipment (UE).

According to an aspect of the present invention, there is provided an MAC sharing method for distributed processing of UE traffic in a mobile communication system including a plurality of modems covering one or more beam spots dividing a base station cell and a plurality of MACs managing the plurality of modems and divided into one or more MAC groups including two or more MACs connected to each other, the MAC sharing method including: operation (a) of determining, by each MAC belonging to an identical MAC group, a number of pieces of UE managed by the MAC and a total amount of traffic of all the pieces of UE; operation (b) of determining whether there are MACs having total amounts of traffic satisfying a condition of distribution and a condition of receiving distribution based on the information determined in operation (a); and operation (c) of distributing, when it is determined in operation (b) that there are MACs having total amounts of traffic satisfying the condition of distribution and the condition of receiving distribution, traffic of an MAC satisfying the condition of distribution to an MAC satisfying the condition of receiving distribution.

In the above-described configuration, each of the MAC groups may include MACs horizontally and vertically adjacent to each other.

Whether or not the condition of distribution is satisfied may be determined by whether or not the total amount of traffic exceeds a normal uppermost value $N_U$ determined as a maximum of an amount of traffic generally processable by an arbitrary MAC, and whether or not the condition of receiving distribution is satisfied may be determined by whether or not a total amount of traffic is smaller than a normal lowermost value $N_L$ determined as a minimum of an amount of traffic generally processable by an arbitrary MAC. Here, the normal uppermost value $N_U$>the normal lowermost value $N_L$.

An amount of traffic distributed to the MAC satisfying the condition of receiving distribution in operation (c) may be determined to be smaller than a value obtained by subtracting an average A, which is determined to be an average of amounts of traffic of all MACs belonging to the identical MAC group, from a total amount of traffic of the MAC satisfying the condition of distribution.

The normal uppermost value $N_U$ and the normal lowermost value $N_L$ may be determined according to the following relationship: the normal uppermost value $N_U$>the average A>the normal lowermost value $N_L$.

An amount of traffic distributed to the MAC satisfying the condition of receiving distribution in operation (c) may be determined to be smaller than a value obtained by subtracting a median M, which is fixedly determined in relation to the normal uppermost value $N_U$ and the normal lowermost value $N_L$, from a total amount of traffic of the MAC satisfying the condition of distribution, and the normal uppermost value $N_U$>the median M>the normal lowermost value $N_L$.

Whether or not the condition of distribution is satisfied may be determined by whether or not the total amount of traffic exceeds a normal uppermost value $N_U$ determined as a maximum of an amount of traffic generally processable by an arbitrary MAC, whether or not the condition of receiving distribution is satisfied may be determined by whether or not a difference $D_t$ between a total amount of traffic of an MAC satisfying the condition of distribution and a total amount of traffic of an arbitrary MAC exceeds a predetermined reference value R, and an amount of traffic distributed to the MAC satisfying the condition of receiving distribution in operation (c) may be determined to be smaller than a value obtained by subtracting an average A, which is determined to be an average of amounts of traffic of all MACs belonging to the identical MAC group, from the total amount of traffic of the MAC satisfying the condition of distribution, or determined to be smaller than a value obtained by subtracting a median M, which is fixedly determined in relation to the normal uppermost value $N_U$ and a normal lowermost value $N_L$ (the normal uppermost value $N_U$>the median M>the normal lowermost value $N_L$) from the total amount of traffic of the MAC satisfying the condition of distribution.

The distribution of the traffic may be performed in units of UE.

When there are two or more MACs satisfying the condition of distribution, priority of distribution may be given to an MAC determined in order of decreasing amount of traffic to be distributed, in order of decreasing number of pieces of UE to be distributed, or according to rules in which the two orders are taken into consideration.

When there are two or more MACs satisfying the condition of receiving distribution, the distribution may be performed to an MAC determined in order of increasing number of pieces of managed UE, in order of increasing total amount of managed traffic, or according to rules in which the two orders are taken into consideration.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 4A to 4E are diagrams showing various forms of MAC groups in an MAC sharing method for distributed processing of UE traffic in a mobile communication system according to an exemplary embodiment of the present invention;

DETAILED DESCRIPTION

A media access control processing unit (MAC) sharing method for distributed processing of user equipment (UE) traffic in a mobile communication system according to an exemplary embodiment of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
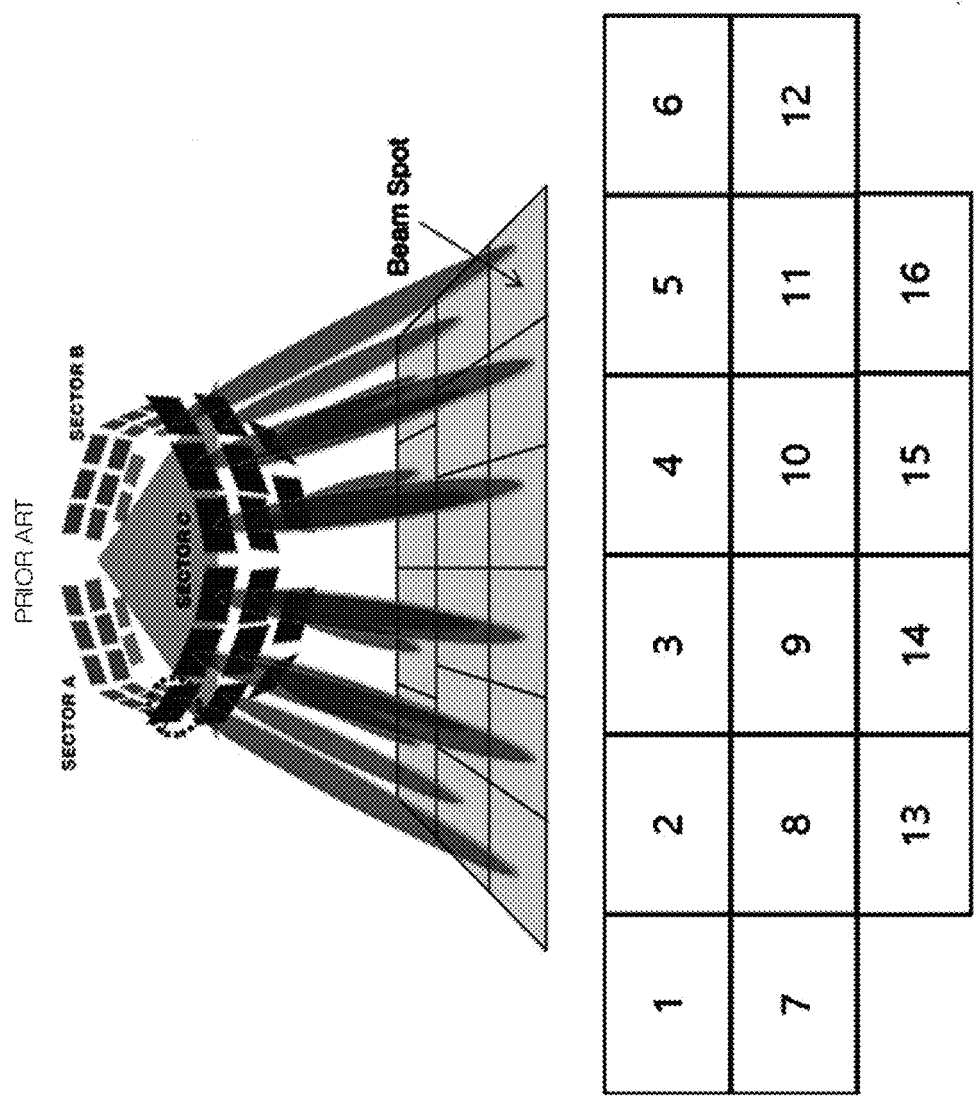
FIG. 1 is a diagram showing a configuration of a base station that is applicable to fifth generation (5G) mobile communication.
Figure 2:
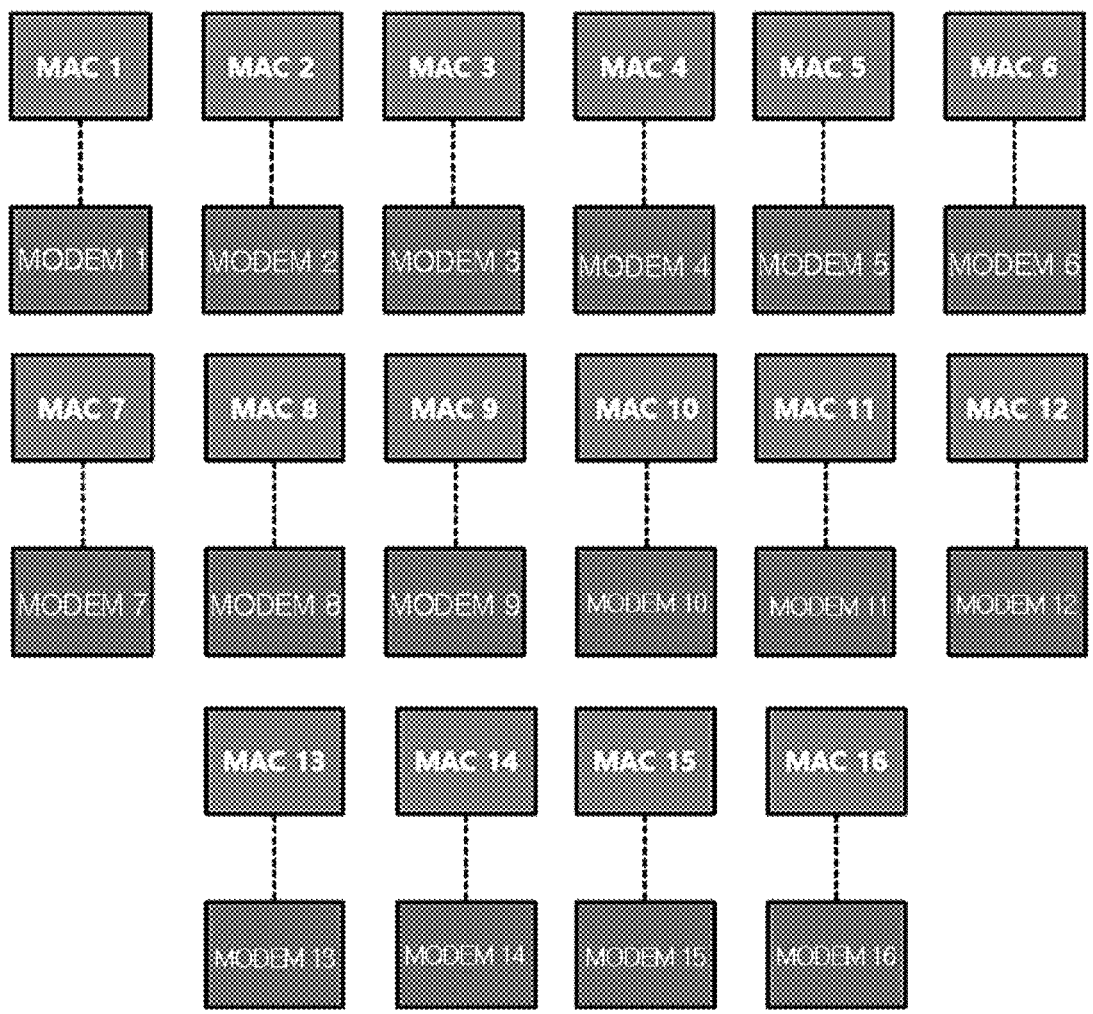
FIG. 2 shows a connection relationship between media access control processing units (MACs) and modems in 5G mobile communication.
Figure 3:
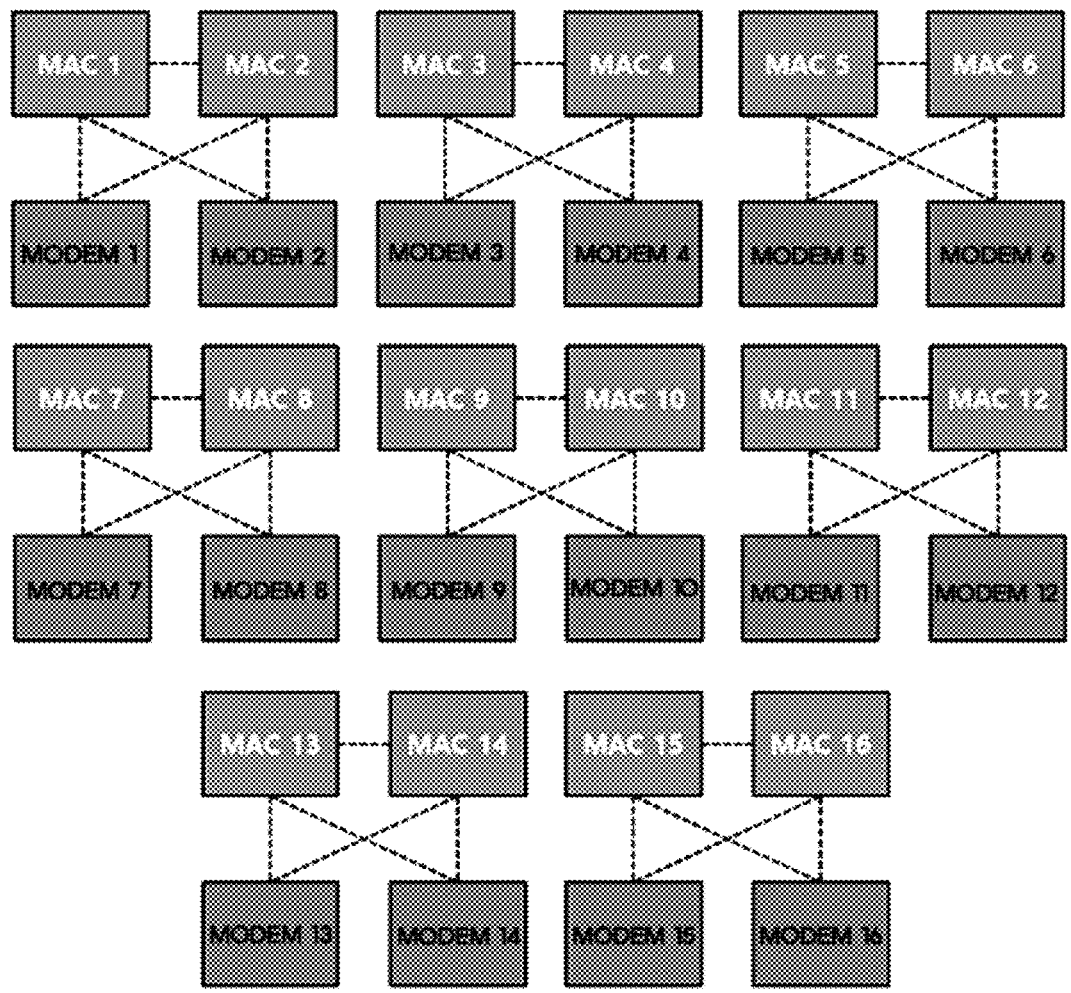
FIG. 3 is a diagram showing a connection state between MACs and modems based on an MAC sharing method for distributed processing of user equipment (UE) traffic in a mobile communication system according to an exemplary embodiment of the present invention.

FIG. 3 is a diagram showing a connection state between MACs and modems based on an MAC sharing method for distributed processing of UE traffic in a mobile communication system according to an exemplary embodiment of the present invention. As shown in FIG. 3, according to an exemplary embodiment of the present invention, a total of 16 modems corresponding to a total of 16 beam spots on a one-to-one basis can be paired and managed as a total of eight MAC groups to each of which two MACs are allocated.

As indicated by dotted lines in the example of FIG. 3, each of first and second modems is connected to both first and second MACs, and the first and second MACs are connected to each other. Likewise, each of $15^{th}$ and $16^{th}$ modems which are the last two modems is connected to both $15^{th}$ and $16^{th}$ MACs, and the $15^{th}$ and $16^{th}$ MACs are connected to each other. Due to this configuration, traffic for UE connected to modems belonging to each MAC group can be distributed and managed by the MAC group. As a result, when a large amount of UE traffic occurs at any one beam spot, the UE traffic is managed in a distributed manner, so that service quality can be improved.

Figure 4A:
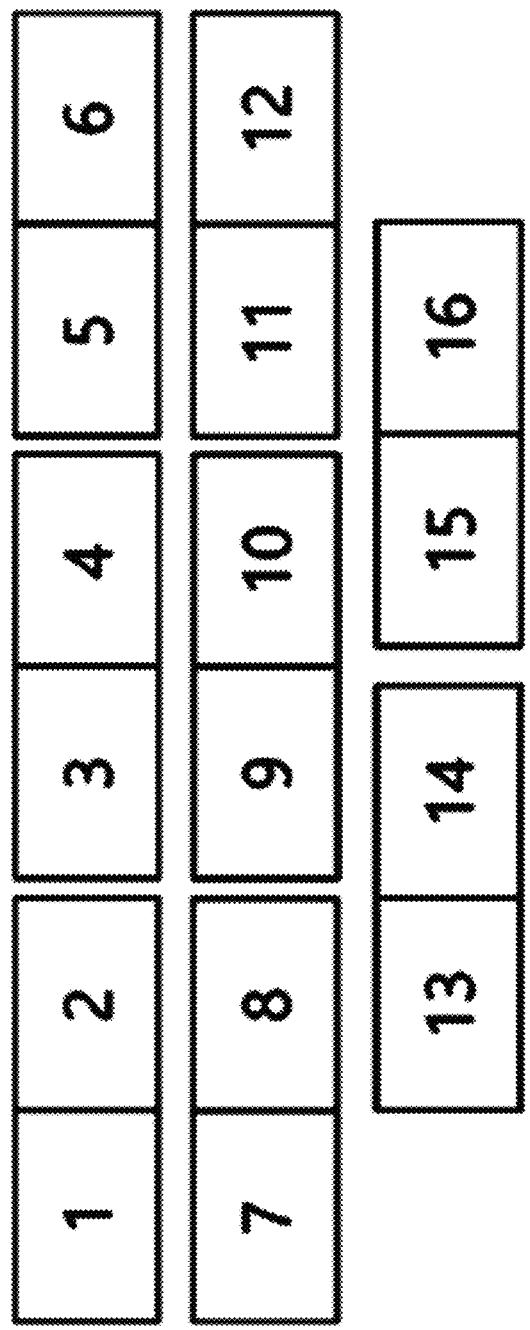

FIGS. 4A to 4E are diagrams showing various forms of MAC groups in an MAC sharing method for distributed processing of UE traffic in a mobile communication system according to an exemplary embodiment of the present invention. First, FIG. 4A shows an example in which two MACs are included in each MAC group. In this case, all MACs belonging to each MAC group are connected to all modems belonging to the MAC group (this is the same in FIGS. 4B to 4E). Among first to $12^{th}$ MACs, each upper MAC and the corresponding lower MAC may also be paired as a group.

Figure 4B:
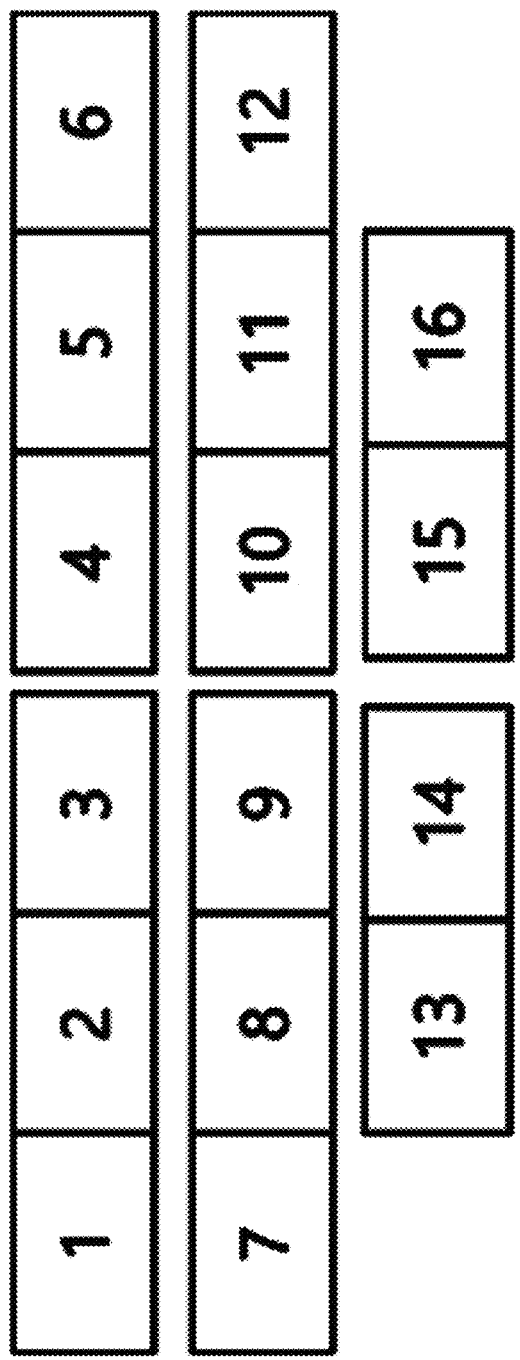

FIG. 4B shows an example in which three MACs are included in each MAC group. Considering that the number of beam spots, that is, MACs, is not a multiple of three, four MAC groups each include three MACs, and two MAC groups each include two of the remaining four MACs not included in the four MAC groups (or one MAC group may include the remaining four MACs).

Figure 4C:
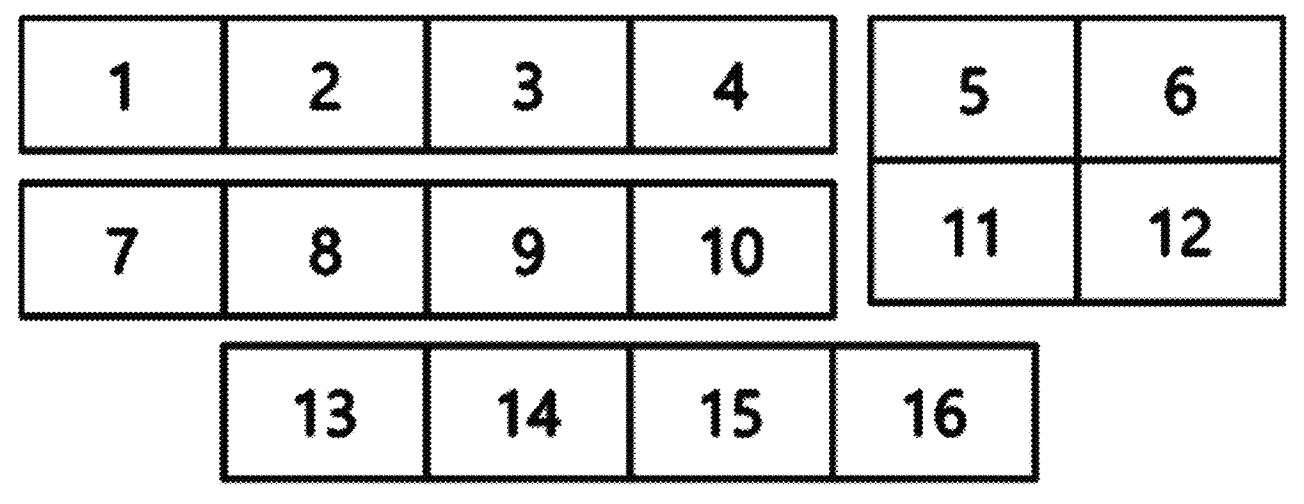

FIG. 4C shows an example in which four MACs are included in each MAC group. The first to fourth MACs which are four front MACs in the first row and the seventh to tenth MACs which are four front MACs in the second row are included in two respective MAC groups. Also, the fifth and sixth MACs, which are the remaining two MACs in the first row, and the $11^{th}$ and the $12^{th}$ MACs, which are the remaining two MACs in the second row, are included one MAC group, and the $13^{th}$ to $16^{th}$ MACs in the last row are included in one MAC group.

Needless to say, when four MACs are allocated to each MAC group, the MACs may be grouped as follows: (1, 2, 7, 8), (3, 4, 5, 6), (9, 10, 11, 12), and (13, 14, 15, 16).

Figure 4D:
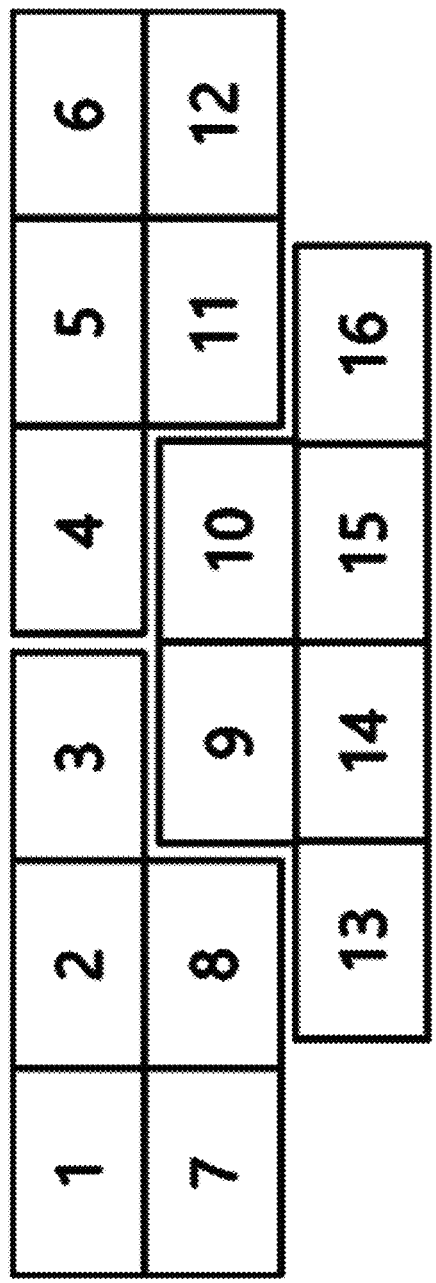

FIG. 4D shows an example in which five MACs are included in each MAC group. Considering that the number of beam spots, that is, MACs, is not a multiple of five, five MACs are allocated to each of two MAC groups, and the remaining six MACs which are not allocated to the two MAC groups are allocated to one MAC group. In other words, the MACs are grouped as follows: (1, 2, 3, 7, 8), (4, 5, 6, 11, 12), and (9, 10, 13, 14, 15, 16). Needless to say, alternatively, the MACs may be grouped as follows: (1, 2, 7, 8, 13), (5, 6, 11, 12, 16), and (3, 4, 9, 10, 14, 15).

Figure 4E:
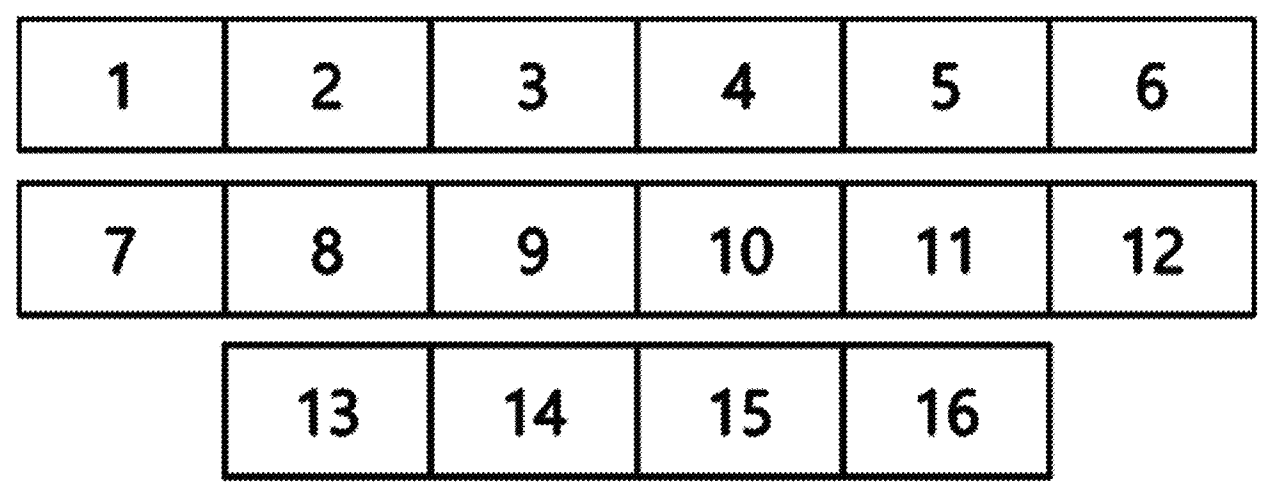

FIG. 4E shows an example in which six MACs are included in each MAC group. Considering that the number of beam spots, that is, MACs, is not a multiple of six, six MACs are allocated to each of two MAC groups, and the remaining four MACs which are not allocated to the two MAC groups are allocated to one MAC group. In other words, the MACs are grouped as follows: (1, 2, 3, 4, 5, 6), (7, 8, 9, 10, 11, 12), and (13, 14, 15, 16). Needless to say, alternatively, the MACs may be grouped as follows: (1, 2, 3, 7, 8, 9), (4, 5, 6, 10, 11, 12), and (13, 14, 15, 16).

In the same way, a total of 16 MACs may be divided into two groups including seven MACs and one group including two MACs, or two groups including eight MACs. In this case also, as described above, it is preferable to group adjacent MACs together.

Figure 5:
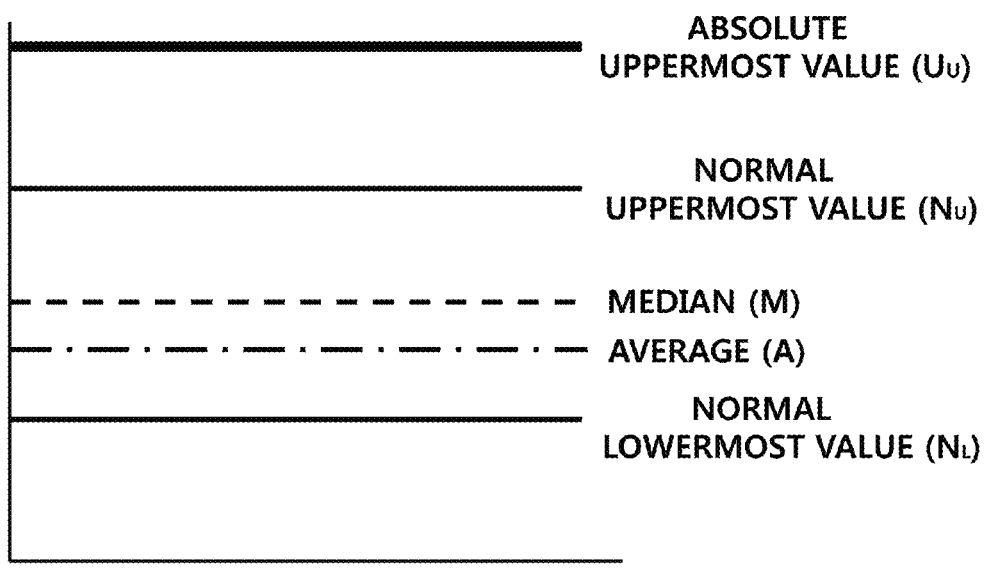
FIG. 5 is a diagram exemplifying various reference values that can be used in an MAC sharing method for distributed processing of UE traffic in a mobile communication system according to an exemplary embodiment of the present invention.

FIG. 5 is a diagram exemplifying various reference values that can be used in an MAC sharing method for distributed processing of UE traffic in a mobile communication system according to an exemplary embodiment of the present invention. As shown in FIG. 5, in an MAC sharing method for distributed processing of UE traffic in a mobile communication system according to an exemplary embodiment of the present invention, an absolute uppermost value $U_U$, a normal uppermost value $N_U$, a normal lowermost value $N_L$, a median M, an average A, etc. can be used. In addition to these, a difference $D_t$ in the amount of traffic between two arbitrary MACs and a reference value R for the difference $D_t$ may be used.

Here, the absolute uppermost value $U_U$ may be a reference value indicating the maximum amount of UE traffic that can be processed by an arbitrary beam spot, that is, an arbitrary MAC. When the amount of UE traffic that can be processed by an arbitrary MAC exceeds the absolute uppermost value $U_U$, it is preferable to unconditionally distribute an excess amount of traffic to an MAC having a relatively small amount of traffic.

The normal uppermost value $N_U$ and the normal lowermost value $N_L$ respectively denote the uppermost value and the lowermost value of the amount of UE traffic that can be generally processed by an arbitrary MAC. When the amount of UE traffic that can be processed by an arbitrary MAC is between the normal uppermost value $N_U$ and the normal lowermost value $N_L$, even if there is an imbalance between the amounts of UE traffic processed by respective MACs, it is preferable not to distribute the traffic so as to avoid the system complexity resulting from frequent traffic distribution.

Next, the median M is the median between the normal uppermost value $N_U$ and the normal lowermost value $N_L$. For example, when the amount of traffic of an arbitrary MAC exceeds the normal uppermost value $N_U$ and the amount of traffic of another MAC is smaller than the median M, a distribution policy may be configured to distribute an excess amount of traffic of the arbitrary MAC to the other MAC.

Meanwhile, the average A is obtained by averaging the amounts of traffic of all MACs belonging to the corresponding group in real time (practically, at very short periods). Based on the average A, the normal uppermost value $N_U$ and the normal lowermost value $N_L$ may be variably set. In other words, each of the normal uppermost value $N_U$ and the normal lowermost value $N_L$ may be given as a single fixed value set by a user, a plurality of fixed values differentially set according to time, etc., or a variable value based on the average A changing in real time. The normal uppermost value $N_U$ and the normal lowermost value $N_L$ determined based on the median M and the average A may also be determined to have different ranges.

Figure 6:
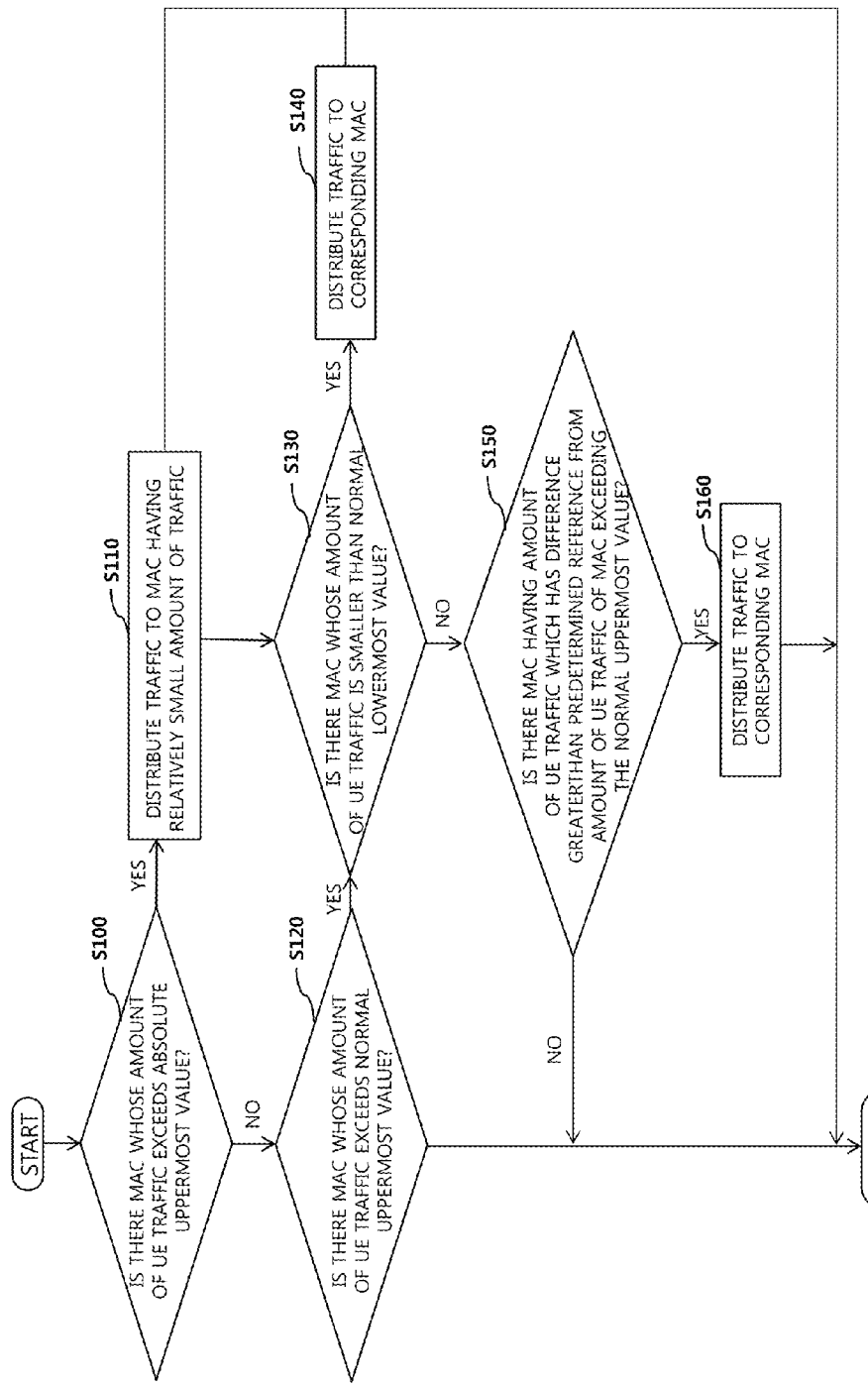
FIG. 6 is a flowchart illustrating an MAC sharing method for distributed processing of UE traffic in a mobile communication system according to an exemplary embodiment of the present invention.

FIG. 6 is a flowchart illustrating an MAC sharing method for distributed processing of UE traffic in a mobile communication system according to an exemplary embodiment of the present invention. First, in operation S100, it is determined whether there is an MAC whose amount of UE traffic exceeds the absolute uppermost value $U_U$ among a plurality of MACs belonging to an identical MAC group. When it is determined in operation S100 that there is an MAC whose amount of UE traffic exceeds the absolute uppermost value $U_U$ among the plurality of MACs belonging to an identical MAC group, an excess amount of UE traffic is distributed to MACs beginning with an MAC which belongs to the identical group and has the least amount of traffic. A detailed distribution policy will be described below. Needless to say, even when the excess amount of UE traffic is distributed to other MACs, if the corresponding amount of UE traffic exceeds the absolute uppermost value $U_U$, it is preferable not to distribute the corresponding amount of UE traffic.

Figure 7A:
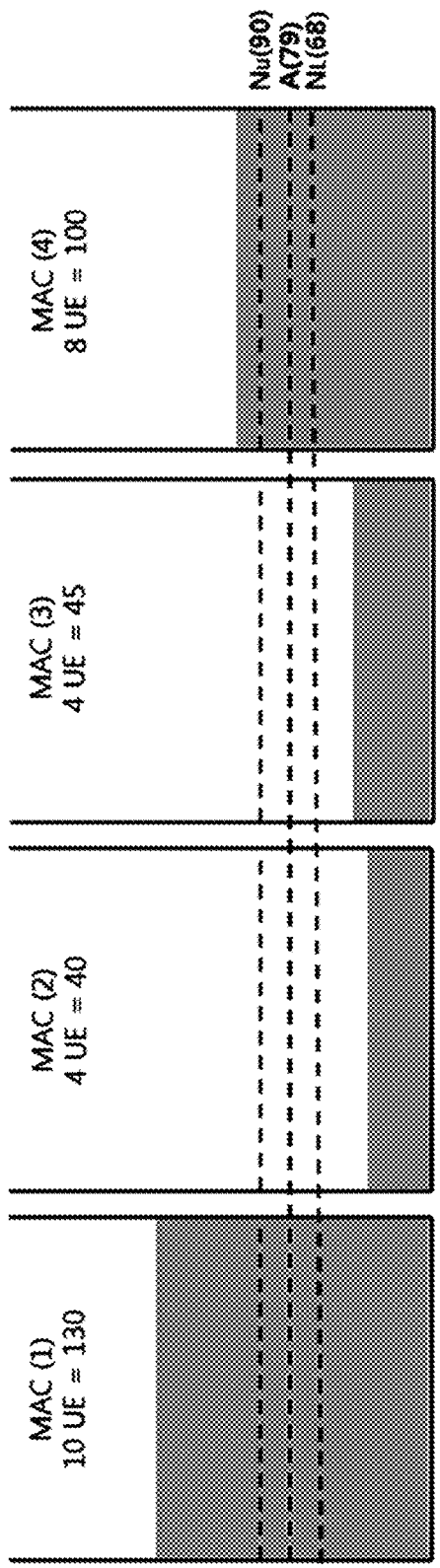
FIGS. 7A to 7D are diagrams illustrating a distributed UE traffic processing process when there are four MACs in one MAC group according to an exemplary embodiment of the present invention.

FIGS. 7A to 7D are diagrams illustrating a distributed UE traffic processing process when there are four MACs in one MAC group according to an exemplary embodiment of the present invention. As shown in FIG. 7A, it is assumed that there are four MACs, that is, MAC(1), MAC(2), MAC(3), and MAC(4) in an arbitrary MAC group, and each MAC has UE and traffic as shown in Table 1 below.

In the example of FIG. 7A, the average A of respective MACs is about 79. Meanwhile, the normal uppermost value $N_U$ and the normal lowermost value $N_L$ determined based on the average A are assumed to be 90 and 68 respectively, and the absolute uppermost value $U_U$ of the amount of UE traffic at each MAC is assumed to be 150.

In the example of FIG. 7A, there is no MAC whose amount of UE traffic exceeds the absolute uppermost value $U_U$, and thus the process proceeds to operation S120. In operation S120, it is determined whether the amount of traffic of an arbitrary MAC exceeds the normal uppermost value $N_U$. In the example of FIG. 7A, the normal uppermost value $N_U$ is 90, and the amounts of traffic of MAC(1) and MAC(4) exceed the normal uppermost value $N_U$.

When it is determined in operation S120 that the amount of traffic of an arbitrary MAC exceeds the normal uppermost value $N_U$, the process proceeds to operation S130, and it is determined whether there is an MAC whose amount of traffic is smaller than the normal lowermost value $N_L$. In the example of FIG. 7A, the amounts of traffic of MAC(2) and MAC(3) are smaller than the normal lowermost value $N_L$. Therefore, the amounts of traffic of MAC(1) and MAC(4) exceeding the average A (or the normal uppermost value $N_U$ or the median M) are distributed to MAC(2) or MAC(3). At this time, it is preferable to distribute traffic of an MAC having a relatively large amount of traffic first to MACs in order of increasing amount of traffic. Accordingly, traffic of MAC(1) having the largest amount of traffic is first distributed to MAC(2) having the smallest amount of traffic.

In the example of FIG. 7A, the amount of UE traffic of MAC(1) exceeding the average A is 51 (=130−79). When all the amount of UE traffic of MAC(1) exceeding the average A is distributed to MAC(2), the amount of traffic of MAC(2) exceeds the average A (40+51=91). Therefore, the amount of traffic which causes the amount of traffic of MAC(2) to be smaller than the average A, that is, the amount of traffic of about 39, is distributed to MAC(2). Here, when traffic of one piece of UE is distributed to different MACs, it is very difficult to manage the traffic. Therefore, it is preferable to cause traffic of one piece of UE to be managed by one MAC. Also, it is preferable, in terms of management, to distribute traffic of a relatively small number of pieces of UE. Therefore, in the example of FIG. 7A, traffic of UE#1 whose amount of traffic is 30, UE#7 whose amount of traffic is 5, and UE#9 whose amount of traffic is 3 is distributed to MAC(2).

Figure 7B:
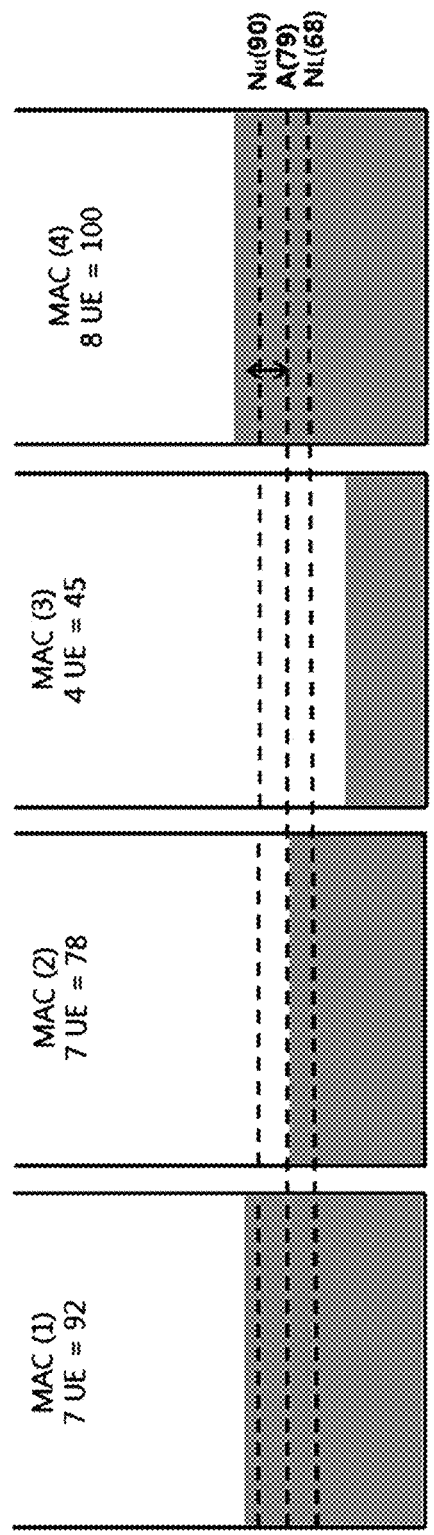

FIG. 7B exemplifies results of the distribution. Since traffic of UE#1, UE#7, and UE#9 whose amounts of traffic are 30, 5, and 3 respectively is distributed from MAC(1) to MAC(2), the number of pieces of UE and the amount of traffic managed by MAC(1) are reduced to 7 and 92, respectively, whereas the number of pieces of UE and the amount of traffic managed by MAC(2) are increased to 7 and 78, respectively. This is shown in Table 2 below.

TABLE 1

| | Number of UE | UE#1 | UE#2 | UE#3 | UE#4 | UE#5 | UE#6 | UE#7 | UE#8 | UE#9 | UE#10 | Sum of traffic |
|---|---|---|---|---|---|---|---|---|---|---|---|---|
| MAC(1) | 10 | 30 | 25 | 20 | 15 | 15 | 10 | 5 | 5 | 3 | 2 | 130 |
| MAC(2) | 4 | 15 | 15 | 5 | 5 | — | — | — | — | — | — | 40 |
| MAC(3) | 4 | 15 | 15 | 10 | 5 | — | — | — | — | — | — | 45 |
| MAC(4) | 8 | 25 | 20 | 15 | 15 | 10 | 5 | 5 | 5 | — | — | 100 |

TABLE 2

| | Number of UE | UE#1 | UE#2 | UE#3 | UE#4 | UE#5 | UE#6 | UE#7 | UE#8 | UE#9 | UE#10 | Sum of traffic |
|---|---|---|---|---|---|---|---|---|---|---|---|---|
| MAC(1) | 7 | — | 25 | 20 | 15 | 15 | 10 | — | 5 | — | 2 | 92 |
| MAC(2) | 7 | 15 | 15 | 5 | 5 | 30 (MAC1 UE#1) | 5 (MAC1 UE#7) | 3 (MAC1 UE#9) | — | — | — | 78 |
| MAC(3) | 4 | 15 | 15 | 10 | 5 | — | — | — | — | — | — | 45 |
| MAC(4) | 8 | 25 | 20 | 15 | 15 | 10 | 5 | 5 | 5 | — | — | 100 |

In the example of FIG. 7B, while the amounts of traffic of MAC(1) and MAC(4) still exceed the normal uppermost value $N_U$, the amount of traffic of MAC(3) is smaller than the normal lowermost value $N_L$. Therefore, the amounts of traffic of MAC(1) and MAC(4) exceeding the average A can be distributed to MAC(3). In this case, it is possible to continuously give the priority of distribution to MAC(1) having the initial priority regardless of the excess amount of traffic, or to give the priority of distribution to MACs in order of decreasing excess amount of traffic. This exemplary embodiment corresponds to the former case.

Figure 7C:
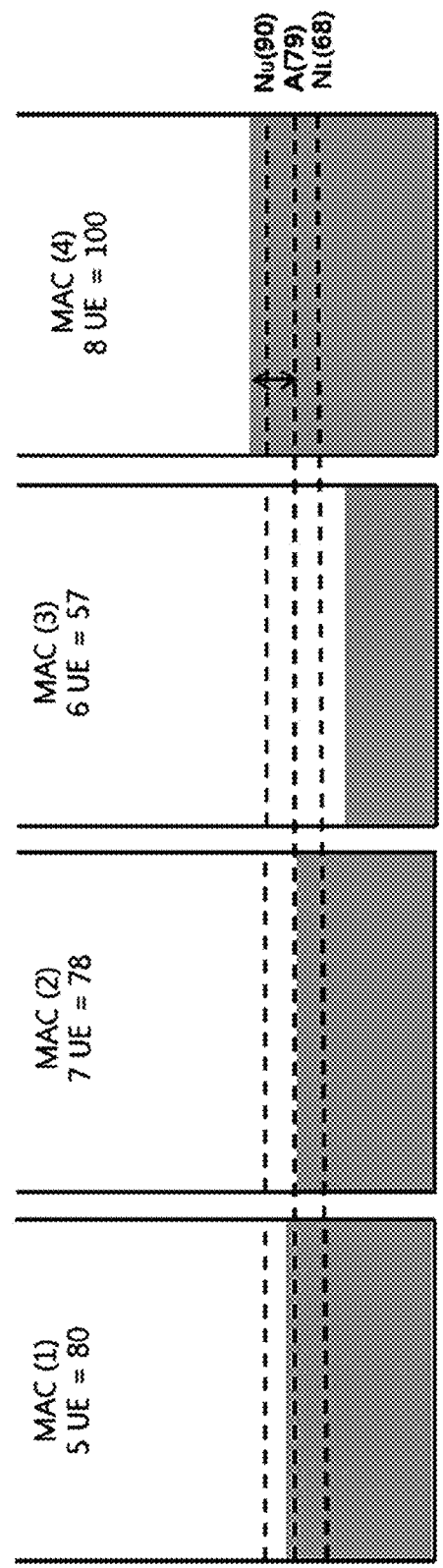
Figure 7D:
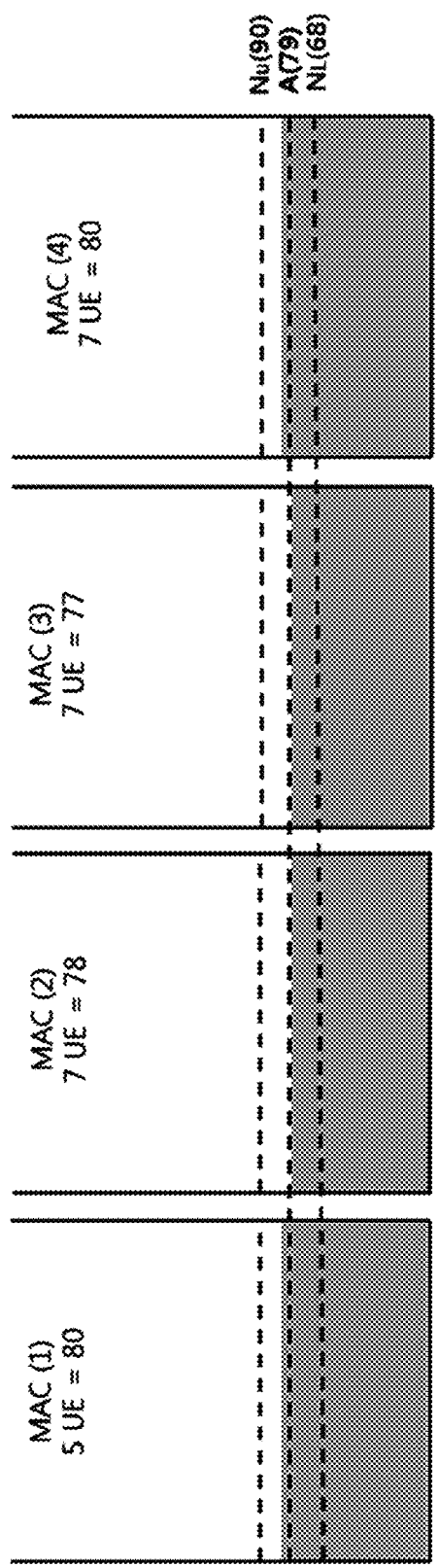

In other words, as shown in FIG. 7C, the amount of traffic of MAC(1) exceeding the average A, that is, the amount of traffic of 13, is distributed to MAC(3). According to the aforementioned distribution policy, traffic of UE#6 whose amount of traffic is 10 and UE#10 whose amount of traffic is 2 is distributed to MAC(3). Accordingly, the number of pieces of UE and the amount of traffic managed by MAC(1) are reduced to 5 and 80, respectively, whereas the number of pieces of UE and the amount of traffic managed by MAC(3) are increased to 6 and 57, respectively. This is shown in Table 3 below.

TABLE 3

| | Number of UE | UE#1 | UE#2 | UE#3 | UE#4 | UE#5 | UE#6 | UE#7 | UE#8 | UE#9 | UE#10 | Sum of traffic |
|---|---|---|---|---|---|---|---|---|---|---|---|---|
| MAC(1) | 5 | — | 25 | 20 | 15 | 15 | — | — | 5 | — | — | 80 |
| MAC(2) | 7 | 15 | 15 | 5 | 5 | 30 (MAC1 UE#1) | 5 (MAC1 UE#7) | 3 (MAC1 UE#9) | — | — | — | 78 |
| MAC(3) | 6 | 15 | 15 | 10 | 5 | 10 (MAC1 UE#6) | 2 (MAC1 UE#10) | — | — | — | — | 57 |
| MAC(4) | 8 | 25 | 20 | 15 | 15 | 10 | 5 | 5 | 5 | — | — | 100 |

In the example of FIG. 7C, while the amount of traffic of MAC(4) still exceeds the normal uppermost value $N_U$, the amount of traffic of MAC(3) is smaller than the normal lowermost value $N_L$. Therefore, the amount of traffic of MAC(4) exceeding the average A can be distributed to MAC(3). In this case also, according to the aforementioned distribution policy, traffic of UE#2 whose amount of traffic is 20 is distributed to MAC(3). Accordingly, the number of pieces of UE and the amount of traffic managed by MAC(4) are reduced to 7 and 80, respectively, whereas the number of pieces of UE and the amount of traffic managed by MAC(3) are increased to 7 and 77, respectively. This is shown in Table 4 below.

TABLE 4

| | Number of UE | UE#1 | UE#2 | UE#3 | UE#4 | UE#5 | UE#6 | UE#7 | UE#8 | UE#9 | UE#10 | Sum of traffic |
|---|---|---|---|---|---|---|---|---|---|---|---|---|
| MAC(1) | 5 | — | 25 | 20 | 15 | 15 | — | — | 5 | — | — | 80 |
| MAC(2) | 7 | 15 | 15 | 5 | 5 | 30 (MAC1 UE#1) | 5 (MAC1 UE#7) | 3 (MAC1 UE#9) | — | — | — | 78 |
| MAC(3) | 7 | 15 | 15 | 10 | 5 | 10 (MAC1 UE#6) | 2 (MAC1 UE#10) | 20 (MAC4 UE#2) | — | — | — | 77 |
| MAC(4) | 7 | 25 | — | 15 | 15 | 10 | 5 | 5 | 5 | — | — | 80 |

Referring back to FIG. 6, when it is determined in operation S130 that there is no MAC whose amount of traffic is smaller than the normal lowermost value $N_L$, the process proceeds to operation S150, and it is determined whether there is an MAC having the amount of traffic which has a difference $D_t$ greater than a predetermined reference value R from the amount of traffic of an MAC exceeding the normal uppermost value $N_U$.

When it is determined in operation S150 that there is an MAC having the amount of traffic which has the difference $D_t$ greater than the predetermined reference value R from the amount of traffic of an MAC exceeding the normal uppermost value $N_U$, the process proceeds to operation S160, and the excess amount of traffic is distributed to the corresponding MAC.

Thus far, an MAC sharing method for distributed processing of UE traffic in a mobile communication system according to an exemplary embodiment of the present invention has been described in detail with reference to the accompanying drawings. However, this is a mere example, and it will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

For example, in the aspect of a distribution right, MACs belonging to an identical group may frequently exchange the numbers of pieces of UE and the amounts of traffic managed by themselves, and then a distribution MAC may take the initiative in notifying a distribution-receiving MAC of a distribution and performing the distribution. Alternatively, the distribution MAC may only notify its number of pieces of UE and traffic information to MACs capable of receiving the distribution among other MACs in an identical group, and one or more MACs among the MACs capable of receiving the distribution may take the initiative in performing the distribution.

In addition, in the aspect of performing a distribution, the distribution may be performed beginning with UE having a large amount of traffic or a small amount of traffic. The latter case may be more preferable.

As described above, when an MAC sharing method for distributed processing of UE traffic in a mobile communication system according to an exemplary embodiment of the present invention is used, it is possible to improve service by efficiently distributing UE traffic to be processed by respective arbitrary MACs with the arbitrary MACs physically or logically connected to a plurality of modems.

What is claimed is:

1. A media access control processing unit (MAC) sharing method for distributed processing of user equipment (UE) traffic in a mobile communication system including a plurality of modems covering one or more beam spots dividing a base station cell and a plurality of MACs managing the plurality of modems and divided into a plurality of MAC groups including two or more MACs connected to each other, the MAC sharing method comprising:
each MAC belonging to an identical MAC group performs the steps of:
(a) determining a number of pieces of UE managed by the MAC and a total amount of traffic of all the pieces of UE;
(b) determining whether there are MACs having total amounts of traffic satisfying a condition of distribution and a condition of receiving distribution based on the numbers of pieces of UE managed by MACs belonging to the identical group and the total amounts of traffic of all pieces of UE managed by the respective MACs determined in step (a); and
(c) distributing, when it is determined in step (b) that there are MACs having total amounts of traffic satisfying the condition of distribution and the condition of receiving distribution, the amount of traffic of an MAC exceeding the condition of distribution to an MAC satisfying the condition of receiving distribution.

2. The MAC sharing method of claim 1, wherein each of the MAC groups includes MACs horizontally and vertically adjacent to each other.

3. The MAC sharing method of claim 2, wherein whether or not the condition of distribution is satisfied is determined by whether or not the total amount of traffic exceeds a normal uppermost value $N_U$ determined as a maximum of an amount of traffic generally processable by an arbitrary MAC,
whether or not the condition of receiving distribution is satisfied is determined by whether or not a total amount of traffic is smaller than a normal lowermost value $N_L$ determined as a minimum of an amount of traffic generally processable by an arbitrary MAC, and the normal uppermost value $N_U$>the normal lowermost value $N_L$.

4. The MAC sharing method of claim 3, wherein an amount of traffic distributed to the MAC satisfying the condition of receiving distribution in step (c) is determined to be smaller than a value obtained by subtracting an average A, which is determined to be an average of amounts of traffic of all the MACs belonging to the identical MAC group, from a total amount of traffic of the MAC satisfying the condition of distribution.

5. The MAC sharing method of claim 4, wherein the normal uppermost value $N_U$ and the normal lowermost value $N_L$ are determined according to a following relationship: the normal uppermost value $N_U$>the average A>the normal lowermost value $N_L$.

6. The MAC sharing method of claim 3, wherein an amount of traffic distributed to the MAC satisfying the condition of receiving distribution in step (c) is determined to be smaller than a value obtained by subtracting a median M, which is fixedly determined in relation to the normal uppermost value $N_U$ and the normal lowermost value $N_L$, from a total amount of traffic of the MAC satisfying the condition of distribution, and the normal uppermost value $N_U$>the median M>the normal lowermost value $N_L$.

7. The MAC sharing method of claim 2, wherein whether or not the condition of distribution is satisfied is determined by whether or not the total amount of traffic exceeds a normal uppermost value $N_U$ determined as a maximum of an amount of traffic generally processable by an arbitrary MAC,
whether or not the condition of receiving distribution is satisfied is determined by whether or not a difference $D_t$ between a total amount of traffic of an MAC satisfying the condition of distribution and a total amount of traffic of an arbitrary MAC exceeds a predetermined reference value R, and
an amount of traffic distributed to the MAC satisfying the condition of receiving distribution in step (c) is determined to be smaller than a value obtained by subtracting an average A, which is determined to be an average of amounts of traffic of all the MACs belonging to the identical MAC group, from the total amount of traffic of the MAC satisfying the condition of distribution, or determined to be smaller than a value obtained by subtracting a median M, which is fixedly determined in relation to the normal uppermost value $N_U$ and a normal lowermost value $N_L$ (the normal uppermost value $N_U$>the median M>the normal lowermost value $N_L$) from the total amount of traffic of the MAC satisfying the condition of distribution.

8. The MAC sharing method of claim 1, wherein the distribution of the traffic is performed in units of UE.

9. The MAC sharing method of claim 8, wherein, when there are two or more MACs satisfying the condition of distribution, priority of distribution is given to an MAC determined in order of decreasing amount of traffic to be distributed, in order of decreasing number of pieces of UE to be distributed, or according to rules in which the two orders are taken into consideration.

10. The MAC sharing method of claim 8, wherein, when there are two or more MACs satisfying the condition of receiving distribution, the distribution is performed to an MAC determined in order of increasing number of pieces of managed UE, in order of increasing total amount of managed traffic, or according to rules in which the two orders are taken into consideration.

* * * * *